(12) United States Patent
Park et al.

(10) Patent No.: US 12,442,735 B2
(45) Date of Patent: Oct. 14, 2025

(54) SEPARATION AND CONCENTRATION SYSTEM FOR IONIC COMPOUNDS IN SAMPLE, AND METHOD FOR ANALYZING IONIC COMPOUNDS USING SAME

(71) Applicant: LG Chem, Ltd., Seoul (KR)

(72) Inventors: Byung Hyun Park, Daejeon (KR); Sehoon Kim, Daejeon (KR); Jaehyuk Nam, Daejeon (KR); Byoung Hyoun Kim, Daejeon (KR); Su Youn Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 691 days.

(21) Appl. No.: 17/796,397

(22) PCT Filed: Sep. 1, 2021

(86) PCT No.: PCT/KR2021/011781
§ 371 (c)(1),
(2) Date: Jul. 29, 2022

(87) PCT Pub. No.: WO2022/092537
PCT Pub. Date: May 5, 2022

(65) Prior Publication Data
US 2023/0341301 A1    Oct. 26, 2023

(30) Foreign Application Priority Data

Oct. 30, 2020  (KR) .................. 10-2020-0143088
Aug. 26, 2021  (KR) .................. 10-2021-0113127

(51) Int. Cl.
*G01N 1/40*    (2006.01)

(52) U.S. Cl.
CPC ..... *G01N 1/405* (2013.01); *G01N 2001/4016* (2013.01)

(58) Field of Classification Search
CPC ................. G01N 1/405; G01N 1/4005; G01N 2001/4016; G01N 2001/4011;
(Continued)

(56) References Cited

U.S. PATENT DOCUMENTS

| 2008/0047834 A1 | 2/2008 | Park et al. |
| 2008/0083621 A1 | 4/2008 | Sideris |
| 2020/0041392 A1 | 2/2020 | Lee et al. |

FOREIGN PATENT DOCUMENTS

| JP | 2005294181 A | 10/2005 |
| JP | 2008527320 A | 7/2008 |

(Continued)

OTHER PUBLICATIONS

Luo et al., "Low-Voltage Origami-Paper-Based Electrophoretic Device for Rapid Protein Separation". Analytical chemistry. Dec. 2, 2014, vol. 86, No. 24, pp. 12390-12397.

(Continued)

*Primary Examiner* — Kathryn Elizabeth Limbaugh
(74) *Attorney, Agent, or Firm* — Lerner David LLP

(57) ABSTRACT

A system for separating and concentrating ionic compounds in a sample is provided herein. In some embodiments, a system includes at least one sample separation device, a flexible holder having a plurality of slots, wherein each slot is configured to have a sample separation device inserted therein, wherein the at least one sample separation device is inserted into a slot of the flexible holder; and an electrode for applying a voltage to the device, wherein the at least one sample separation device comprises a separation portion, a first storage portion, and a second storage portion, wherein the first and second storage portions are positioned on opposing sides of the separation portion, wherein the separation portion is folded at a predetermined interval to form two or more discrete base units.

14 Claims, 10 Drawing Sheets

(58) Field of Classification Search
CPC ... G01N 2001/4088; G01N 2001/2826; G01N 27/447; G01N 30/74
See application file for complete search history.

(56) References Cited

FOREIGN PATENT DOCUMENTS

| KR | 20060058830 A | 6/2006 |
|----|---------------|--------|
| KR | 20170005195 A | 1/2017 |
| KR | 20170082843 A | 7/2017 |
| KR | 20170114754 A | 10/2017 |
| KR | 101789043 B1 | 11/2017 |
| KR | 20190020915 A | 3/2019 |
| KR | 20200046596 A | 5/2020 |
| KR | 20200074832 A | 6/2020 |
| WO | 2018062686 A1 | 4/2018 |

OTHER PUBLICATIONS

International Search Report for PCT/KR2021/011781 dated Dec. 16, 2021. 3 pgs.

[Fig. 1]
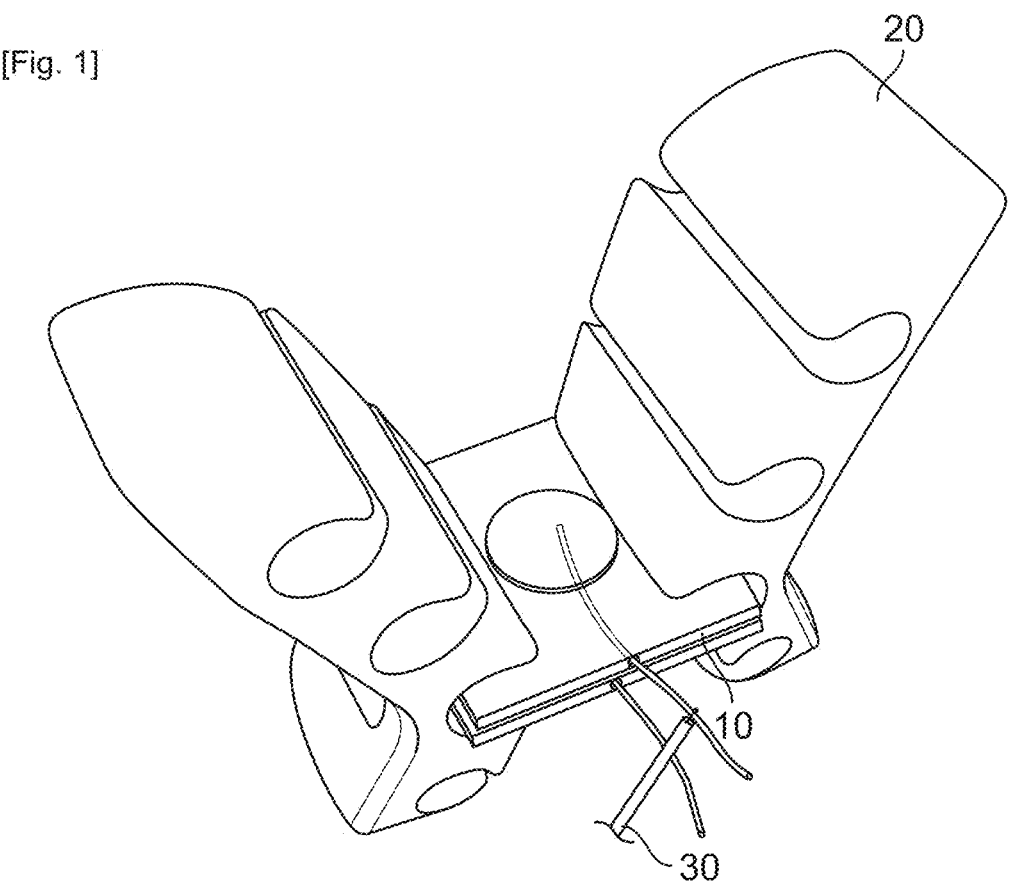
[Fig. 2a]
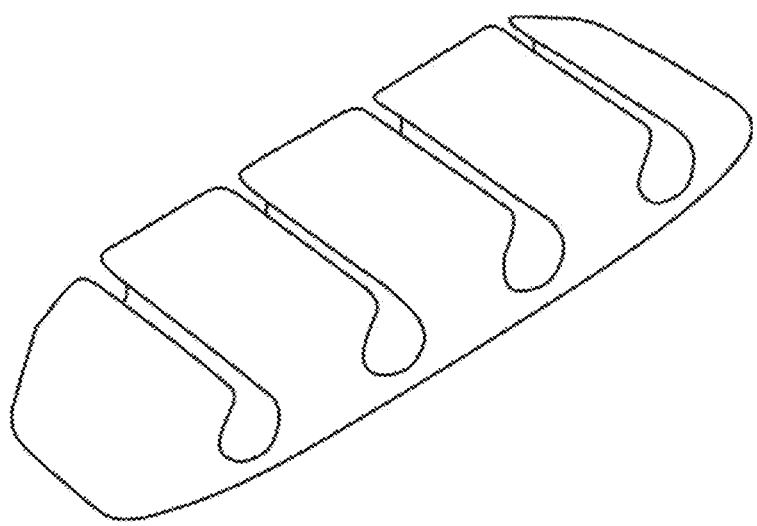

[Fig. 2b]
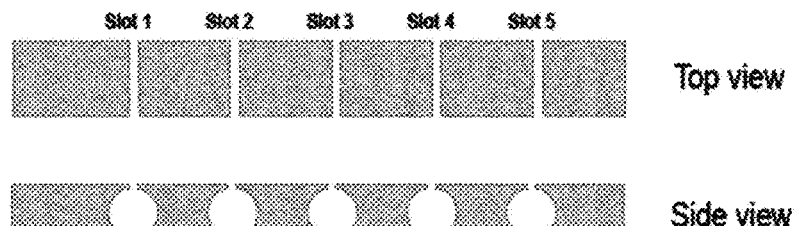
[Fig. 3a]
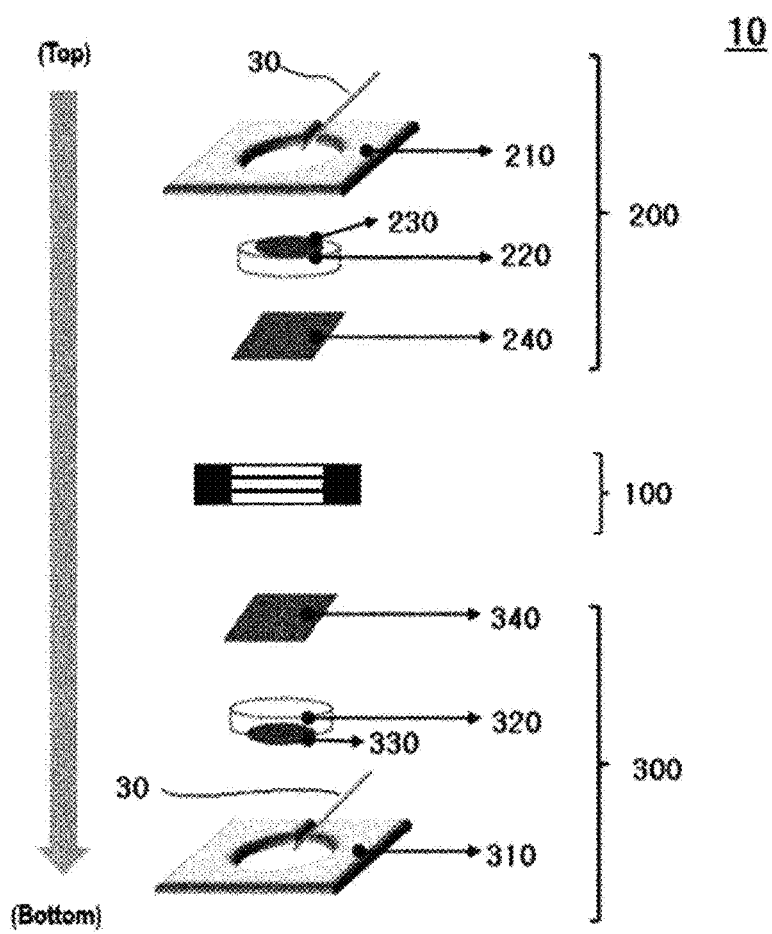

[Fig. 3b]
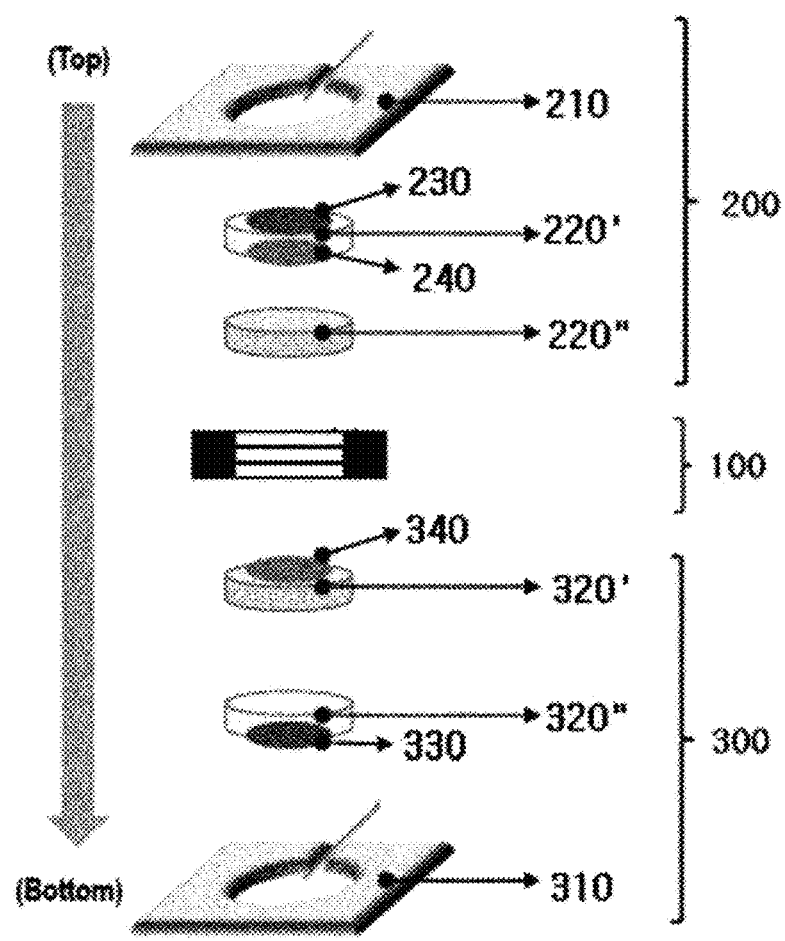

[Fig. 3c]
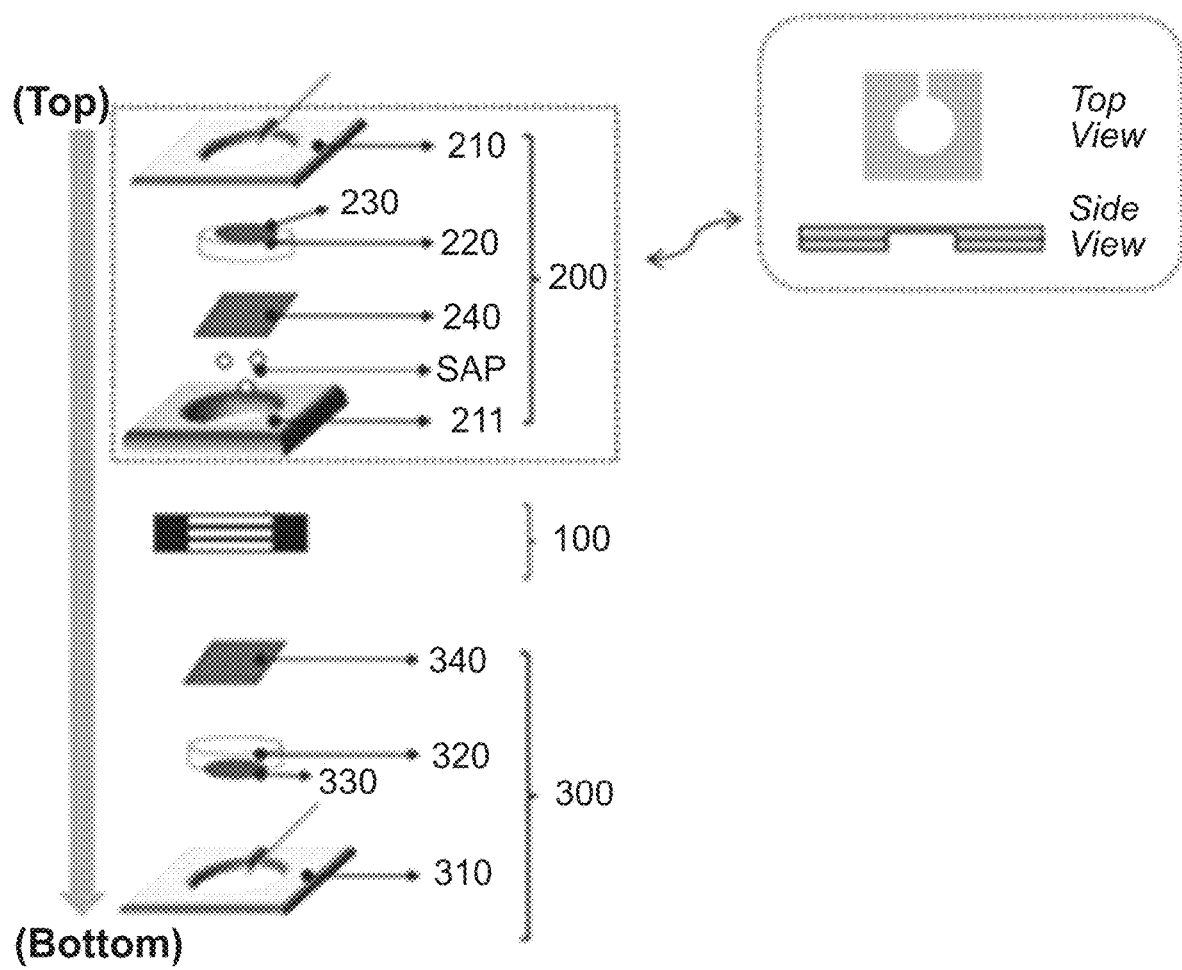
[Fig. 4]
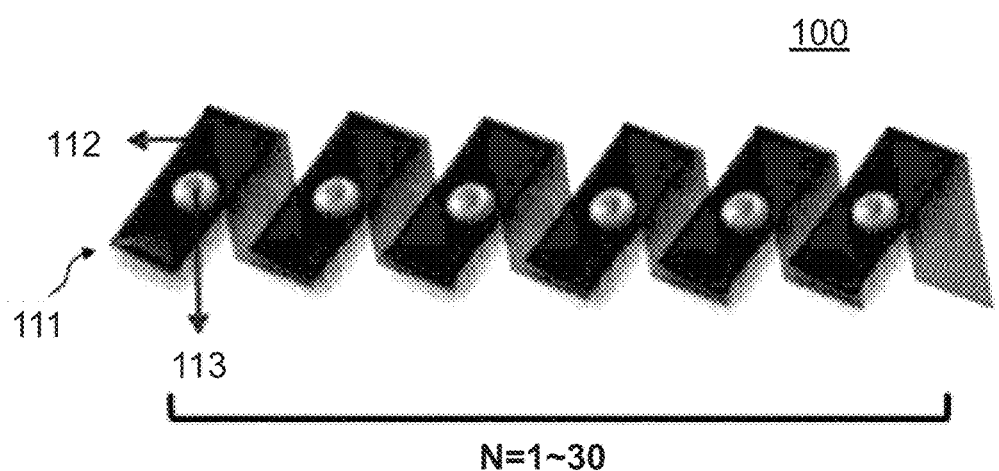

[Fig. 5]
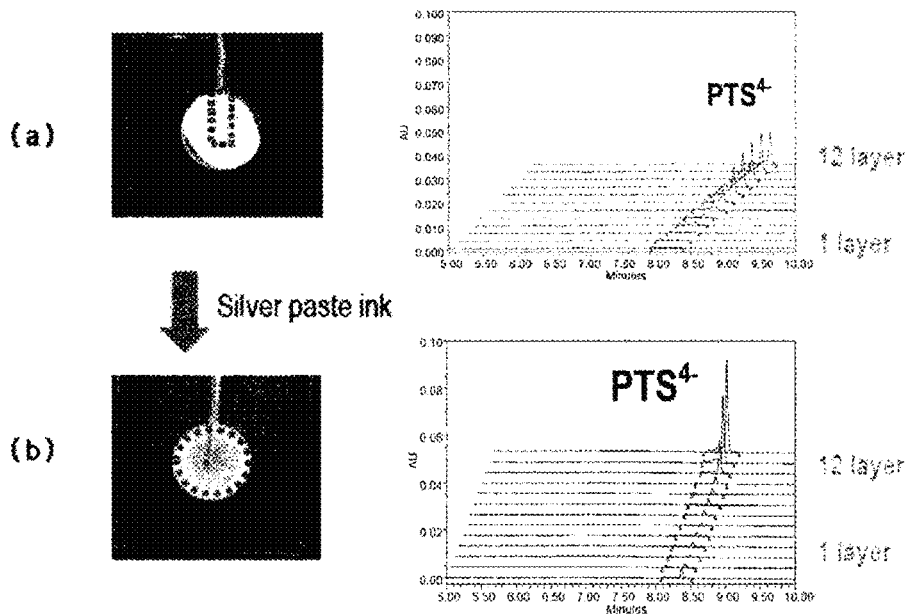
[Fig. 6]
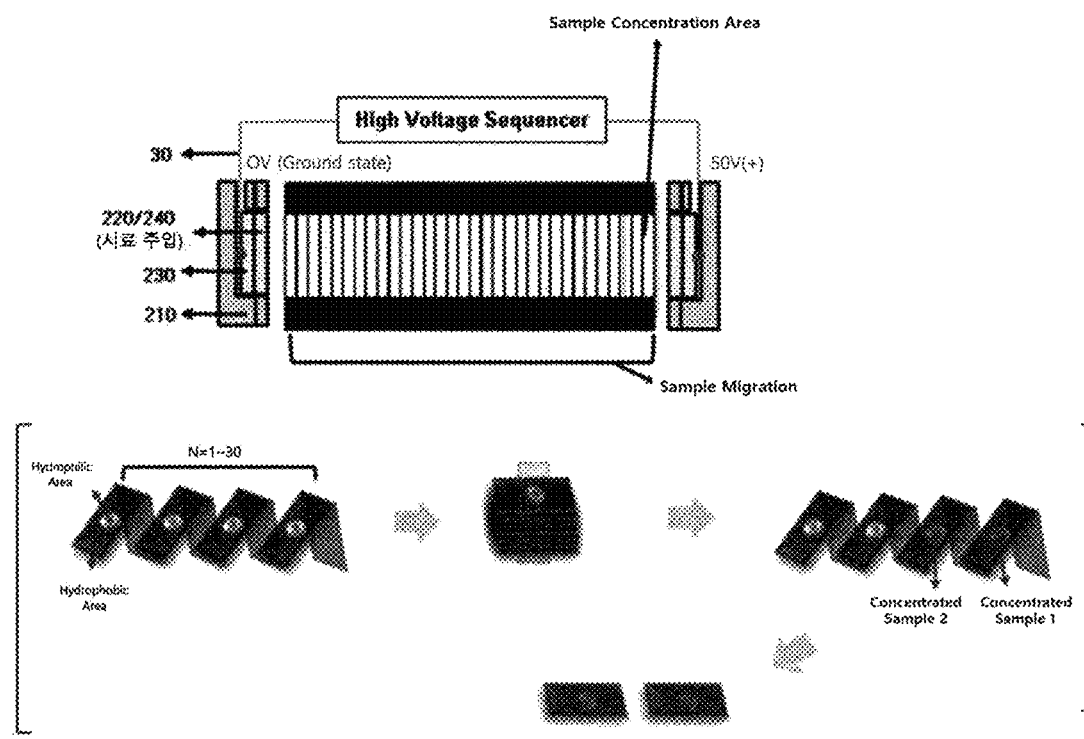

[Fig. 7a]
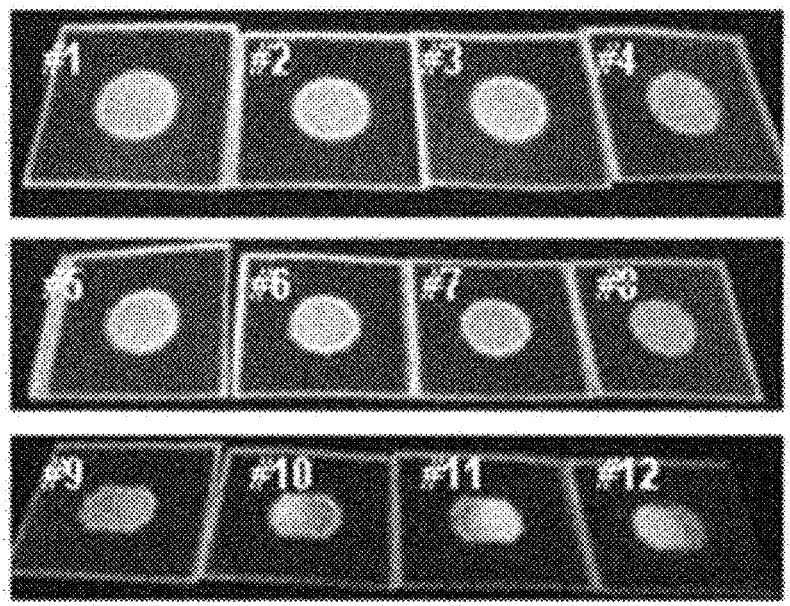
[Fig. 7b]
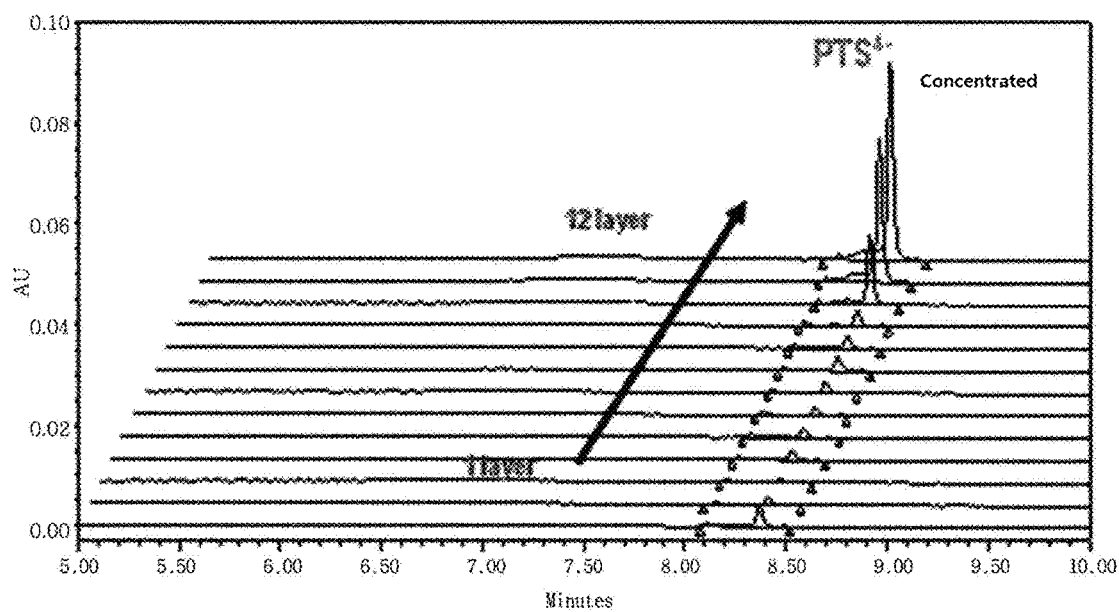

[Fig. 8a]
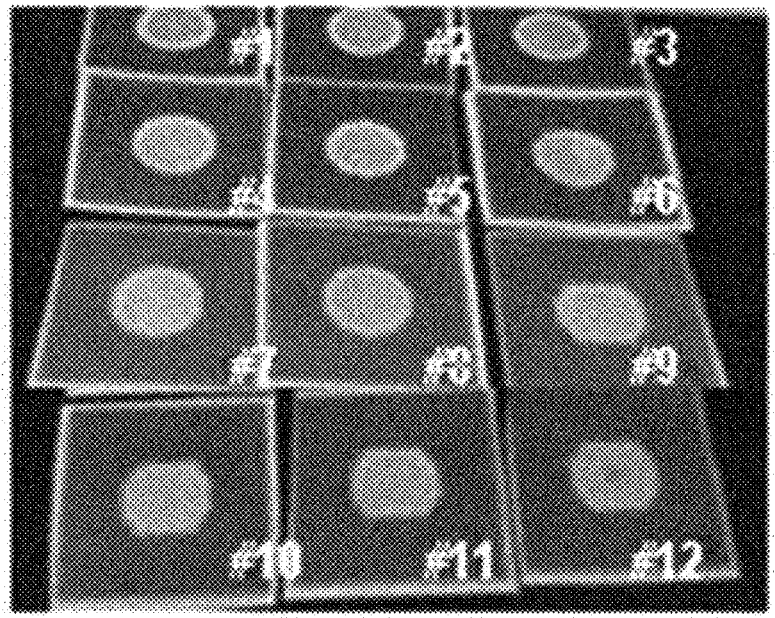
[Fig. 8b]
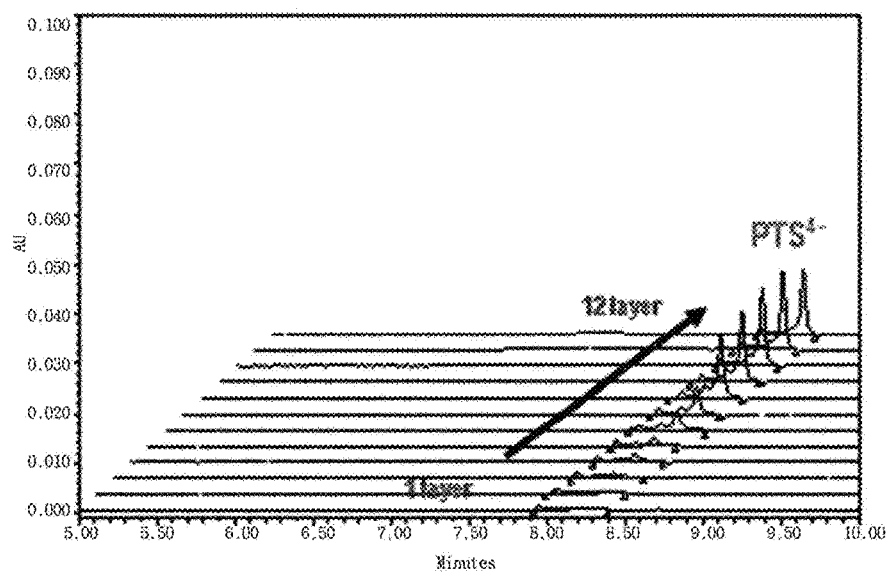

[Fig. 9]
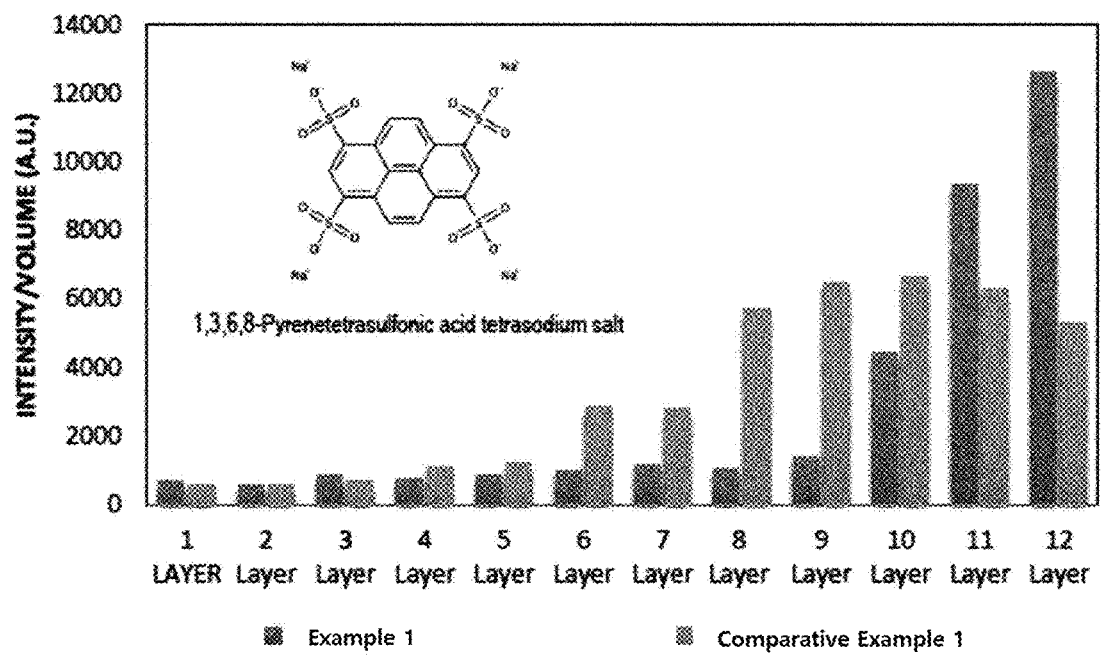
[Fig. 10]
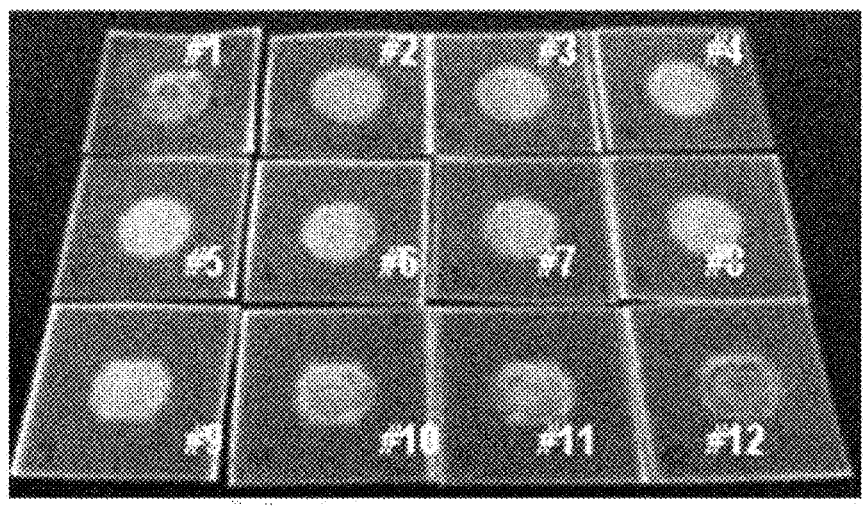

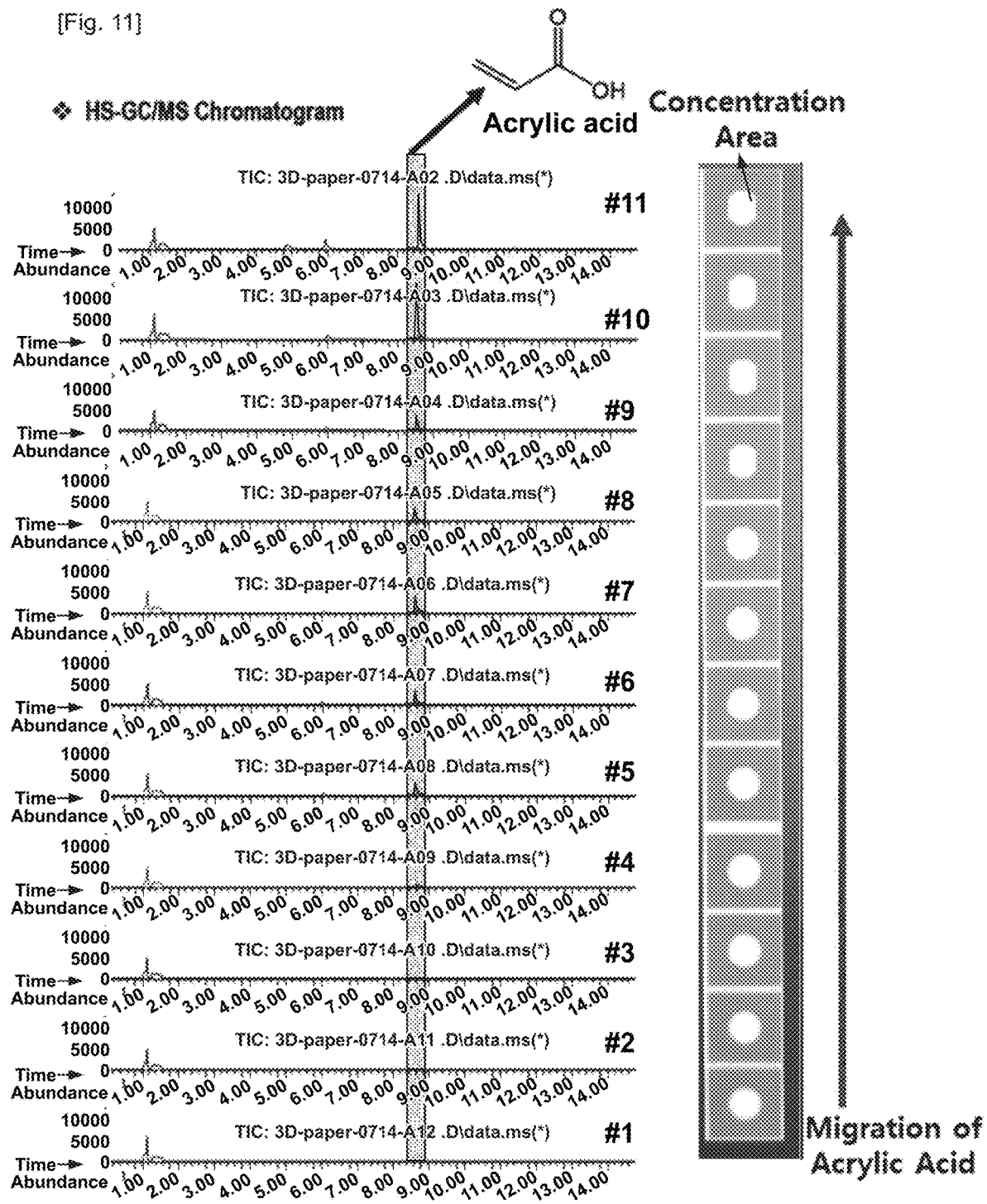
[Fig. 11]

[Fig. 12]
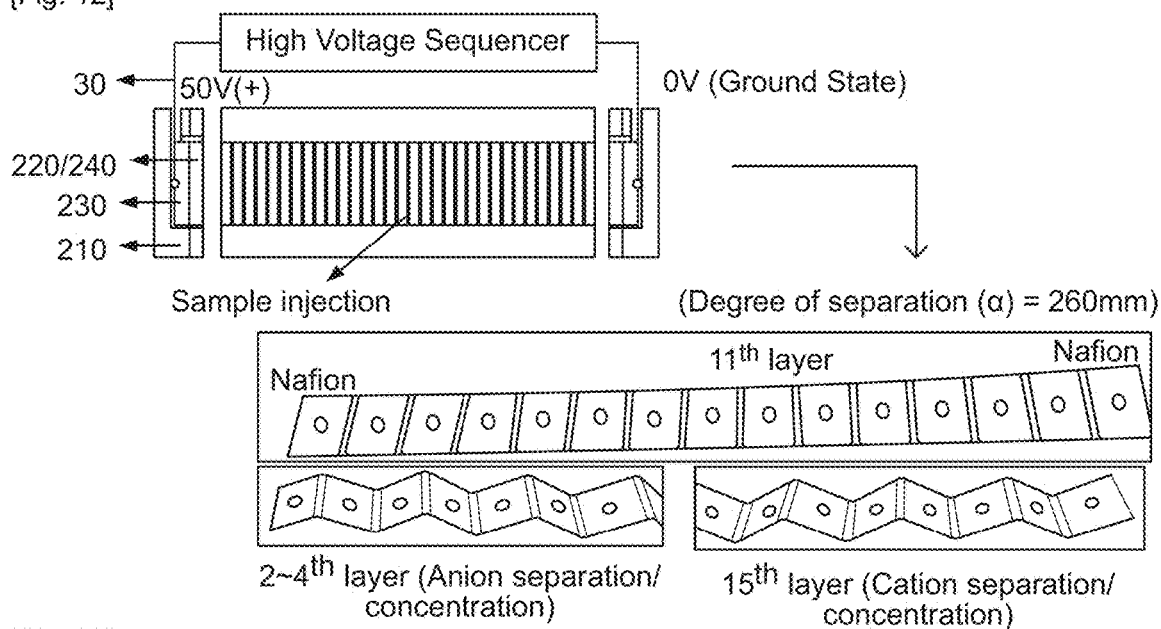
[Fig. 13]
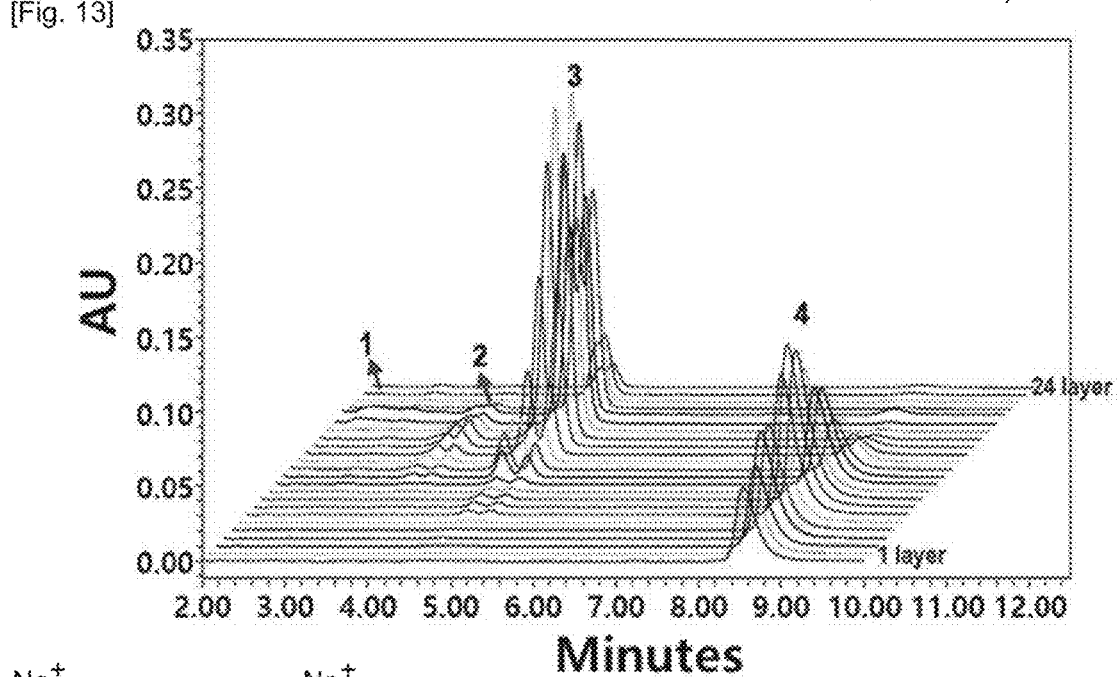
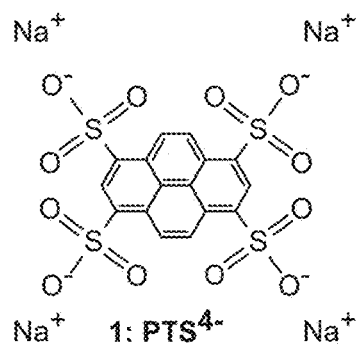
1: PTS⁴⁻
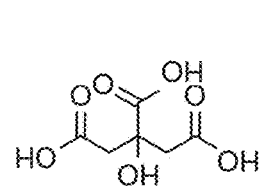
2: Citric acid
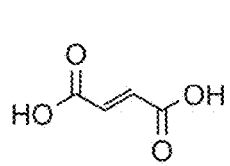
3: Fumaric acid
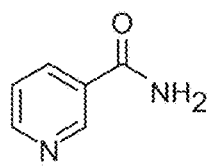
4: Nicotinamide (Vitamin B)

SEPARATION AND CONCENTRATION SYSTEM FOR IONIC COMPOUNDS IN SAMPLE, AND METHOD FOR ANALYZING IONIC COMPOUNDS USING SAME

CROSS-REFERENCE TO RELATED APPLICATIONS

This application is a national phase entry under 35 U.S.C. § 371 of International Application No. PCT/KR2021/011781, filed on Sep. 1, 2021, which claims benefit of priority from Korean Patent Application No. 10-2020-0143088, filed on Oct. 30, 2020 and Korean Patent Application No. 10-2021-0113127, filed on Aug. 26, 2021, the disclosures of which are incorporated by reference herein.

TECHNICAL FIELD

The present invention relates to a system for separating and concentrating an ionic compound in a sample and a method for analyzing an ionic compound using the same, and more particularly, to a system capable of simultaneously multiple ionic compounds contained in a sample, and a method for analyzing an ionic compound by using the same.

BACKGROUND ART

Ionic compounds, such as organic acids, are used in various applications such as food additives, pharmaceuticals, raw materials for bioenergy, cleaning agents for electronic device parts, and raw materials of plasticizer, and therefore, it may be necessary to separate and analyze organic acids in samples for diagnosis of various diseases and evaluation of physical properties of foods and materials.

In general, the separation of the organic acids in the sample is performed by a liquid phase extraction using an extraction solvent. As a strong acid or basic solution is mainly used as the extraction solvent, there is a problem of environmental pollution due to toxicity. In addition, the separated organic acids can be concentrated using various concentration equipment including distillation or membrane prior to analysis, but such concentration has a limitation in huge equipment and high energy consumption. For example, with a nitrogen concentrator such as TurboVap (manufactured by Biotage), concentration is performed by separating organic acids and then injecting nitrogen. However, since water with a high boiling point is generally used as a solvent for the sample containing organic acids, a high temperature is required to volatilize the solvent, and therefore there is an inconvenience of continuous injection of nitrogen gas.

Accordingly, there is a need for a pretreatment method for more efficiently separating and concentrating organic acids, which are ionic compounds, from samples.

DETAILED DESCRIPTION OF THE INVENTION

Technical Problem

It is an object of the present invention to provide a system capable of simultaneously separating and concentrating multiple ionic compounds contained in a sample, and a method for analyzing ionic compounds by using the same.

Solution to Problem

The present invention provides a system for separating and concentrating an ionic compound in a sample, the system comprising:

at least one sample separation device; a flexible holder having a plurality of slots, wherein each slot is configured to have a sample separation device inserted therein, wherein the at least one sample separation device is inserted into a slot of the flexible holder; and an electrode for applying a voltage to the device, wherein the at least one sample separation device comprises a separation portion, a first storage portion, and a second storage portion, wherein the first and second storage portions are positioned on opposing sides of the separation portion, wherein the separation portion of the device is folded at a predetermined interval to form two or more discrete base units, and each of the two or more base units includes a porous substrate, a pattern coating layer on one surface of the porous substrate and a reservoir formed in an area excluding the pattern coating layer and serving as a movement path, and wherein each of the first and second storage portions of the device includes a support, an absorbent pad inserted into the support, a conductive ink layer positioned on one side of the absorbent pad, and a selective ion permeable layer positioned on the other side of the absorbent pad and configured to connect to the separation portion.

In addition, the present invention provides a method for analyzing an ionic compound in a sample using the above system, the method comprising:

(S1) injecting an ionic compound-containing sample(s) into a sample separation device(s) of the system;
(S2) folding the sample separation device(s) and inserting into each slot of a flexible holder, followed by applying a voltage to the folded device(s) to conduct the separation and concentration of the ionic compound-containing sample(s); and
(S3) unfolding the folded sample separation device(s) and then recovering the concentrated components from the ionic compound-containing sample(s) for analysis.

Effect of the Invention

According to the system of the present invention, it is possible to simultaneously separate and concentrate a plurality of organic acids contained in a sample by using a flexible holder with slots, to process a large amount of sample by using an absorbent pad, and to improve concentration efficiency by promoting a uniform electric field application through a conductive ink layer.

BRIEF DESCRIPTION OF DRAWINGS

FIG. 1 schematically shows the structure of the separation and concentration system according to an embodiment of the present invention.

FIGS. 2a and 2b schematically illustrate the structure of a flexible holder included in the system according to an embodiment of the present invention and slots formed therein, respectively.

FIGS. 3a to 3c illustrate various aspects of a sample separation device included in the system according to an embodiment of the present invention, respectively.

FIG. 4 schematically illustrates a separation portion of a sample separation device included in the system according to an embodiment of the present invention.

FIGS. 5a and 5b are diagrams illustrating electric field uniformity according to whether or not a conductive ink layer is formed on an absorbent pad in a system according to an embodiment of the present invention.

FIG. 6 illustrates a process of separating, concentrating, and analyzing a sample using a system according to an embodiment of the present invention.

FIGS. 7a and 7b show the results of separation and concentration of the sample according to Example 1.

FIGS. 8a and 8b show the results of separation and concentration of the sample according to Comparative Example 1.

FIG. 9 shows a comparison of the concentration efficiency of Example 1 and Comparative Example 1.

FIGS. 10 to 13 show the results of separation and concentration of samples according to Examples 2 to 5, respectively.

BEST MODE FOR CARRYING OUT THE INVENTION

Hereinafter, the terms or words used in the present specification and claims should not be construed as being limited to conventional or dictionary meanings, and should be interpreted as meanings and concepts consistent with the technical spirit of the present invention based on principles that the inventor can appropriately define the concept of a term to best describe his invention.

An embodiment of the present invention relates to a system capable of simultaneously separating and concentrating each of a plurality of organic acids contained in a sample.

FIG. 1 schematically shows the structure of a separation and concentration system 1 according to an embodiment of the present invention, wherein the system 1 includes a sample separation device 10, a flexible holder into which the folded device is inserted, and an electrode 30 for applying a voltage to the device.

In the system 1 of the present invention, as illustrated in FIGS. 2a and 2b, at least one sample separation device 10 in a folded state is mounted in the flexible holder 20 having a plurality of slots, and then an appropriate voltage is applied to the device according to the type of organic acid in the sample injected into the device, whereby different organic acids can be simultaneously separated and concentrated. Thus, with the system of the present invention, various organic acids can be separated and concentrated in a single process by applying an optimal voltage according to the type of organic acid in multiple channels.

Referring to FIGS. 2a and 2b, the flexible holder 20 has a plurality of slots formed with a uniform interval, and when bending, it has the expanded inner diameter of the slot due to its flexibility, resulting in providing a space where the folded device is inserted. For example, at least one sample separation device 10 with folded to a thickness of 0.1 to 1 mm, for example 0.2 mm, is respectively inserted into each slot of the flexible holder 20 and a voltage may be applied to each device stably. The size of the flexible holder is not particularly limited, and the number of slots may vary depending on the number of samples to be analyzed.

In the system of the present invention, the sample separation device 10 is a member for performing separation and concentration by injecting a sample, and specifically, it comprises the separation portion 100 and the first and second storage portions 200, 300 positioned on both sides of the separation portion (see FIGS. 3a to 3c).

The separation portion 100 included in the sample separation device 10 may have a 3D structure which is folded with a predetermined interval as illustrated in FIG. 4 and may be comprised of two or more discrete base units formed by folding.

The separation portion 100 may be manufactured by pattern coating a hydrophobic material on the porous substrate 111 made of a hydrophilic material. From this, each of the two or more base units may include a hydrophobic pattern coating layer 112, and a hydrophilic reservoir 113 as an uncoated and exposed region.

The porous substrate may be made of a material that can easily adsorb or permeate a hydrophobic material when a liquid moves by the capillary phenomenon, and may be, for example, a hydrophilic paper or cellulose. Of these, the paper can be advantageously used because the liquid moves smoothly without separately providing an external power due to its fibrous structure.

The hydrophobic material used to form the pattern coating layer 112 may be an alcohol fatty acid ester such as wax, but is not limited thereto.

The reservoir 113 corresponds to a hydrophilic region excluding the hydrophobic pattern coating layer 112 on the substrate 111, and when the two or more base units are folded, the reservoirs may be connected to each other to provide a path through which a sample to be analyzed or a buffer is stored or moves. In addition, a sample or a buffer may be injected into some reservoirs among the two or more base units. The shape of the reservoir is not particularly limited, and may be implemented in various shapes such as, for example, a circular shape, a triangular shape, and a rectangular shape.

In the present invention, the size, shape, and number of the base unit comprising the pattern coating layer 112 and the reservoir 113 can be determined as needed, and there is no particular limitation thereto. As an example, the base unit may have a thickness of 0.1 to 0.15 mm, such as 0.13 mm, an area of 60 to 70 mm$^2$, and a volume of 8 to 10 mm$^3$.

Meanwhile, a first storage portion 200 and a second storage portion 300 capable of injecting a sample may be stacked on both sides of the separation unit 100, respectively.

As illustrated in FIG. 3a, the first storage portion 200 and the second storage portion 300 may include supports 210, 310, absorbent pads 220, 320 inserted into the support, conductive ink layers 230, 330 positioned on one side of the absorbent pad and configured to connect to the electrode 30, and selective ion permeable layers 240, 340 positioned on the other side of the absorbent pad and configured to connect to the separation portion 100.

The supports 210, 310 are members having an internal hole for fixing the absorbent pads 220, 320 and may be formed of polycarbonate, polydimethylsiloxane (PDMS), polymethyl methacrylate (PMMA), or a mixture thereof. The size and thickness of the support may vary depending on the absorbent pad fixed therein. For example, when the absorbent pad has a diameter of 4.8 mm, the support may have a thickness of 1 mm and a size of 24 mm×24 mm.

The absorbent pads 220, 320 are introduced to process a sample in a large capacity (e.g., 0.01 ml to a maximum of 2 ml), and can load a sample or a buffer in a large amount. The absorbent pad may be made of fibers having OH functional groups, such as cellulose fibers, gelatin fibers, starch fibers, or a mixture of two or more thereof, and may have a length of 3 to 5 mm and a thickness of 0.1 to 0.2 mm.

The conductive ink layers 230, 330 formed on the surface adjacent to the electrode of the absorption pad is to promote the formation of a uniform electric field when a voltage is applied across the electrodes and may be formed by coating a conductive ink such as a silver-containing paste on the absorbent pad. When such a conductive ink layer is applied, a desired organic acid component can be intensively concentrated in a specific layer of two or more base units constituting the separation unit 100, so that the concentration efficiency may be improved (see FIG. 5*b*). In contrast, if the conductive ink layer is not provided, an electric field caused by an external voltage may not be formed uniformly, so that the concentration efficiency may be lowered (see FIG. 5*a*).

The selective ion permeable layers 240, 340 positioned on the other side of the absorbent pad may induce ion concentration polarization (ICP) when a voltage is applied across the electrodes.

The ion concentration polarization refers to a phenomenon in which ions present in the sample are attracted to an electrode having an opposite electrical property of each ion by an external electric field applied to the electrode, causing electrophoresis (EP), i.e., the migration of cations and anions and providing a boundary layer between ion depletion and ion enrichment through permeating only specific ions by the selective ion permeation layer.

The organic acid to be analyzed in the present invention is generally in the form of an anion, and migrates to the (+) electrode when a voltage is applied. In the system of the present invention having Nation membrane as selective ion permeable layers located before the conductive ink layers which are connected to each of the (+) and (−) electrodes, if a single organic acid-containing sample is concentrated, the organic acids (anions) in the sample injected into the absorbent pad near the (−) electrode move toward the (+) electrode when a voltage is applied and the cations in the buffer pass through the Nafion membrane and move toward the (−) electrode. Accordingly, an ion depletion region is formed near the (−) electrode and an ion enrichment region is formed near the (+) electrode, so that anions can be enriched on the (+) electrode. On the other hand, in the case of a mixed sample, the sample may be injected into the middle of the folded separation portion, and when a voltage is applied, cations migrate toward the (−) electrode and anions migrate toward the (+) electrode by electrophoresis. That is, the anions are enriched by ICP, and the cations are enriched before the Nation membrane due to its hydrophobicity while moving toward the (−) electrode by electrophoresis.

Such a selective ion permeable layer can be implemented with any material as long as it is a material capable of selectively ion permeation, for example, a polyelectrolyte such as Nafion, polystyrene sulfonate, or polyallylamine hydrochloride.

In one embodiment of the present invention, the selective ion permeable layer may be formed by interposing a membrane between the absorbent pad and the separation portion (FIGS. 3*a* and 3*c*), or by pattern coating a selective ion-permeable material on the absorbent pad (FIG. 3*b*).

In addition, the system of the present invention may be configured to include an additional absorbent pad between the absorbent pad and the separation portion, as shown in FIG. 3*b*. Referring to FIG. 3*b*, the first storage portion 200 and the second storage portion 300 each include two absorbent pads, and the additional absorbent pads 220″, 320″ are located between the absorbent pads 220′, 320′ and the separation portion 100.

In addition, the system of the present invention may be configured to further comprise super absorbent polymer (SAP) particles between the absorbent pad and the separation portion, as shown in FIG. 3*c*. Referring to FIG. 3*c*, the first storage portion 200 introduces SAP particles between the absorbent pad 220 and the separation unit 100, and for introduction of the particles, the lower support 211 can be further laminated with the upper support 210.

With the system of the present invention as described above, a uniform electric field can be applied to each of a plurality of sample separation devices and a large amount of sample can be injected, which enable simultaneously separating and concentrating several types of ionic compounds within a short time.

Accordingly, the present invention provides a method for analyzing an ionic compound in a sample by using the above system.

FIG. 6 illustrates a process of separating, concentrating, and analyzing a sample using the system according to an embodiment of the present invention. the method comprising:

(S1) injecting an ionic compound-containing sample(s) into a sample separation device(s) of the system;

(S2) folding the sample separation device(s) and inserting into each slot of a flexible holder, followed by applying a voltage to the device(s) to conduct the separation and concentration of the sample; and (S3) unfolding the folded sample separation device(s) and then recovering the concentrated components for analysis.

In the step S1, the ionic compound-containing sample may be injected in an amount of 0.01 to 2 ml. Thus, in the present invention, it is possible to process a sample in a large capacity, unlike the existing technology for processing a sample on a micro scale.

The voltage in step S2 may be applied to each of the plurality of sample separation devices under a condition of 10 to 100 V, such as 50 V, for 500 to 1000 seconds, respectively.

The components concentrated in step S3 may be analyzed with a conventional analysis method, such as HS-GC/MS, LC/MS, and the like.

Mode for Carrying Out the Invention

Hereinafter, examples will be described in detail for helping understanding of the present invention. However, the examples according to the present invention may be modified in various other forms, and the scope of the present invention should not be construed as being limited to the following embodiments. The embodiments of the present invention are provided for more complete explanation of the present invention to those of ordinary skill in the art.

Example 1

As illustrated in FIG. 1, a system including a sample separation device 10, a flexible holder 20 into which the device is inserted, and an electrode 30 for applying a voltage to the device was prepared. The separation portion of the sample separation device was comprised of 12 base units, and the first and second storage portions were comprised of an absorbent pad coated with a Nafion™ layer and an absorbent pad coated with a silver paste which are inserted into the support, respectively.

An organic acid component ($PTS^{4-}$) having the following structure was injected into the absorbent pad of the sample separation device 10, the sample separation device was folded to a thickness of 0.2 mm and inserted it into the slot of the flexible holder 20, and then a voltage was applied to separate and concentrate the organic acid in the sample (The condition applied is shown in Table 1 below). The components concentrated in the sample separation device were recovered and analyzed under the following condition.

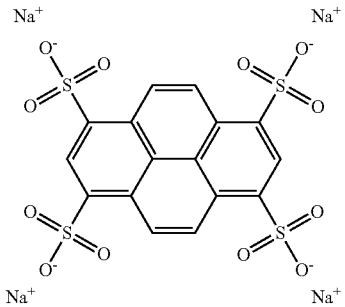 [SMILES: [Na+] ; [Na+] ; O=S(=O)([O-])c1cc(S(=O)(=O)[O-])c2ccc3c(S(=O)(=O)[O-])cc(S(=O)(=O)[O-])c4ccc1c2c43 ; [Na+] ; [Na+]]

| HPLC/UV | |
|---|---|
| HPLC 조건 | Column: HILIC (4.6 mm × 5 cm, 2.7 um) |
| | Eluent A: Acetonitrile/Formic acid (100/0.1, v/v %) |
| | Eluent B: 50 mM Ammonium formate |
| | Gradient: A:B = 95:5(initial)→95:5(5 min)→50:50(10 min) |
| | UV Wavelength: 376 nm |
| | Flow rate: 1 ml/min |
| | Injection volume: 50 uL |

TABLE 1

Sample injection condition

| Material | Concentration | Injection volume | Voltage application condition | | |
|---|---|---|---|---|---|
| | | | Electrode | Voltage (V) | Time (s) |
| $PTS^{4-}$ | 0.1 mg/ml | 0.06 ml | A | 50 | 600 |
| PBS Buffer | 10 mM | 0.2 ml | B | 0 | |

The results of the separation and concentration of the sample according to Example 1 are shown in FIGS. 7a and 7b (HPLC/UV chromatogram), and Table 2.

TABLE 2

| Layer | Retention Time | Intensity | Intensity(Abs at 376 nm)/ Volume (mm³) |
|---|---|---|---|
| PAD control | 8.351 | 223212 | 3875 |
| 1 LAYER | 8.355 | 6659 | 711 |
| 2 Layer | 8.36 | 4959 | 530 |
| 3 Layer | 8.366 | 8079 | 863 |
| 4 Layer | 8.368 | 7126 | 761 |
| 5 Layer | 8.371 | 7407 | 850 |
| 6 Layer | 8.364 | 8688 | 997 |
| 7 Layer | 8.372 | 9981 | 1146 |
| 8 Layer | 8.365 | 9196 | 1056 |
| 9 Layer | 8.359 | 11234 | 1394 |
| 10 Layer | 8.365 | 35412 | 4394 |
| 11 Layer | 8.358 | 75019 | 9308 |
| 12 Layer | 8.357 | 101398 | 12580 |

As can be seen in Table 2, the anion components of $PTS^{4-}$ were concentrated in the $10^{th}$ to $12^{th}$ layers in the 12 base units of the sample separation device 10. Thus, the total value (26,281) of the concentration intensity in the $10^{th}$ to $12^{th}$ layers was about 7 times the initial value (3,875). As such, it is considered that the sample was concentrated in the specific layer of the base unit due to a uniform electric field provided through the coating of the silver paste on the absorbent pad.

Comparative Example 1

The same procedure as in Example 1 was performed except that a silver paste coating layer was not formed on the absorbent pad, and the results are shown in FIGS. 8a and 8b (HPLC/UV chromatogram) and Table 3.

TABLE 3

| Layer | Retention Time | Intensity | Intensity(Abs at 376 nm)/ Volume (mm³) |
|---|---|---|---|
| PAD control | 8.351 | 223212 | 3875 |
| 1 LAYER | 7.951 | 5134 | 549 |
| 2 Layer | 7.95 | 5078 | 543 |
| 3 Layer | 7.968 | 6489 | 693 |
| 4 Layer | 8.223 | 10225 | 1092 |
| 5 Layer | 8.233 | 10490 | 1121 |
| 6 Layer | 8.268 | 24860 | 2656 |
| 7 Layer | 8.284 | 24084 | 2573 |
| 8 Layer | 8.327 | 49769 | 5317 |
| 9 Layer | 8.35 | 52378 | 5596 |
| 10 Layer | 8.368 | 53749 | 5742 |
| 11 Layer | 8.388 | 50591 | 5405 |
| 12 Layer | 8.405 | 42636 | 4555 |

As can be seen in Table 3, in Comparative Example 1, the sample was concentrated with being dispersed in various layers rather than in a specific layer of the 12 base units of the sample separation device 10, and the concentration intensity was reduced compared to Example 1. It is considered that the sample was dispersed in various layers due to the application of a non-uniform electric field as the silver paste coating layer was not applied to the absorbent pad.

The concentration results of $PTS^{4-}$ according to Example 1 and Comparative Example 1 are compared and shown in FIG. 9. It can be seen that the concentration efficiency of Example 1 in which the silver paste (conductive coating layer) was applied is significantly improved compared to Comparative Example 1.

Example 2

The same procedure as in Example 1 was performed except that the sample was injected in an amount of 0.6 ml while additionally introducing 2 mg of SAP resins between the absorbent pad and the separation portion of the sample separation device 10, and the results are shown in FIG. 10.

As can be seen in FIG. 10, the anion components of $PTS^{4-}$ were concentrated in the $10^{th}$ to $12^{th}$ layers in the 12 base units of the sample separation device 10. Thus, it was confirmed that large-capacity processing of samples was possible by introducing an absorbent pad and SAP resins in the system according to the present invention.

Example 3

The same procedure as in Example 1 was performed except that separation and concentration were performed under the condition shown in Table 4 using an acrylic acid-containing sample was used as a sample, and the concentrated components were recovered and analyzed under the following condition.

| Headspace-GC/MS | |
|---|---|
| Headspace Condition | Valve Oven Temp.: [200]° C. |
| | Transfer line Temp.: [200]° C. |
| | Platen/Sample Temp.: [200]° C. |
| | GC cycle time: [30] min |
| | Sample Equil. time: [30] min |
| GC Condition | Column: DB-624 (30 m × 0.25 mm × 1.4 um I.D) |
| | GC oven: 40° C.(5 min)-15° C. min-250° C.(5 min) |
| | (Total 시간: 24 min) |
| | Split ratio: 5:1 |
| | MS: SIM mode (m/z = 45, 55, 72) |

TABLE 4

Sample injection condition

| Material | Concentration | Injection volume | Voltage application condition | | |
|---|---|---|---|---|---|
| | | | Electrode | Voltage (V) | Time (s) |
| Acrylic acid | 10 mg/ml | 0.2 ml | A | 50 | 1000 |
| PBS Buffer | 10 mM | 0.2 ml | B | 0 | |

The results (HS-GC/MS chromatogram) of separation and concentration of acrylic acid according to Example 3 are shown in FIG. 11.

As can be seen in FIG. 11, acrylic acid was concentrated intensively in the $10^{th}$ to $11^{th}$ layers of the 12 base units of the sample separation device.

Example 4

The same procedure as in Example 1 was performed except that the separation portion of the sample separation device 10 was changed from 12 base units to 24 base units, and 0.02 ml of a sample containing anions ($PTS^{4-}$) and cations ($Ru(bph)_6^{2+}$) having the following structures, respectively, was injected into the $11^{th}$ layer of the separation portion.

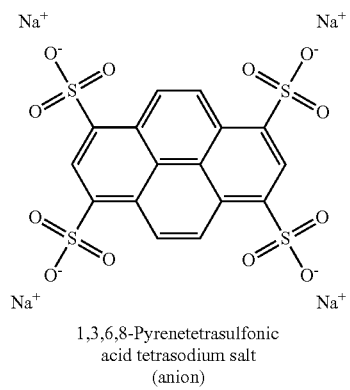

1,3,6,8-Pyrenetetrasulfonic acid tetrasodium salt (anion)

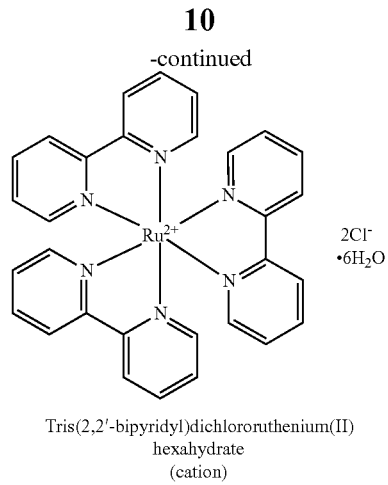

Tris(2,2'-bipyridyl)dichlororuthenium(II) hexahydrate (cation)

The results of separation/concentration of the sample according to Example 4 are shown in FIG. 12.

As can be seen in FIG. 12, when a voltage of 50 V is applied after injecting a mixed sample of cations/anions into the $11^{th}$ layer, the anions ($PTS^{4-}$) migrate from the (−) electrode to the (±) electrode and are concentrated in the $2^{nd}$ layer to $4^{th}$ layer, and the cations ($Ru(bph)_3$) migrate from the (+) electrode to the (−) electrode and are concentrated in the $15^{th}$ layer. In addition, the degree of separation (a) which is defined as the relative distance (mm) between anions and cations was calculated to be 260.

Example 5

The same procedure as in Example 1 was performed except that the separation portion of the sample separation device 10 was changed from 12 base units to 24 base units, and 0.06 ml of a sample containing four organic acids, i.e., $PTS^{4-}$, citric acids, fumaric acids and nicotinamide was injected. The results are shown in FIG. 13.

In FIG. 13, it can be seen that $PTS^{4-}$ ($19^{th}$ layer), citric acids ($17^{th}$ layer), fumaric acids ($18^{th}$ layer) and nicotinamide ($8^{th}$ layer) were separated and concentrated at the same time.

The invention claimed is:

1. A system for separating and concentrating an ionic compound in a sample, the system comprising:
   at least one sample separation device;
   a flexible holder having a plurality of slots, wherein each slot is configured to have a sample separation device inserted therein, wherein the at least one sample separation device is inserted into a slot of the flexible holder; and
   an electrode for applying a voltage to the device,
   wherein the at least one sample separation device comprises:
   a separation portion;
   a first storage portion; and
   a second storage portion,
   wherein the first and second storage portions are positioned on opposing sides of the separation portion,
   wherein the separation portion is folded at a predetermined interval to form two or more discrete base units,
   wherein each of the two or more discrete base units includes a porous substrate, a pattern coating layer on one surface of the porous substrate and a reservoir formed in an area excluding the pattern coating layer and serving as a movement path, and wherein each of the first and second storage portions includes a support, an absorbent pad inserted into the support, a conductive ink layer positioned on one side of the absorbent pad, and a selective ion permeable layer positioned on the other side of the absorbent pad and configured to connect to the separation portion.

2. The system for separating and concentrating an ionic compound in a sample according to claim 1, wherein the at least one sample separation device has a thickness of 0.1 to 1 mm.

3. The system for separating and concentrating an ionic compound in a sample according to claim 1, wherein each slot provided in the flexible holder has an inner diameter, and wherein the inner diameter expands when bending.

4. The system for separating and concentrating an ionic compound in a sample according to claim 1, wherein the flexible holder comprises silicone-based polymers or thermoplastic rubber.

5. The system for separating and concentrating an ionic compound in a sample according to claim 1, wherein the selective ion permeable layer is formed by interposing a membrane between the absorbent pad and the separation portion or by pattern coating on the absorbent pad.

6. The system for separating and concentrating an ionic compound in a sample according to claim 1, further comprising a second absorbent pad between the absorbent pad and the separation portion.

7. The system for separating and concentrating an ionic compound in a sample according to claim 1, further comprising super absorbent polymer (SAP) particles between the absorbent pad and the separation portion.

8. The system for separating and concentrating an ionic compound in a sample according to claim 1, wherein the support comprises polycarbonate, polydimethylsiloxane (PDMS), polymethyl methacrylate (PMMA), or a mixture thereof.

9. The system for separating and concentrating an ionic compound in a sample according to claim 1, wherein the absorbent pad has a length of 3 mm to 5 mm and a thickness of 0.1 mm to 0.2 mm.

10. The system for separating and concentrating an ionic compound in a sample according to claim 1, wherein the absorbent pad comprises cellulose fibers, gelatin fibers, starch fibers, or a mixture of two or more thereof.

11. The system for separating and concentrating an ionic compound in a sample according to claim 1, wherein the conductive ink layer is formed by coating a silver-containing paste on the absorbent pad.

12. The system for separating and concentrating an ionic compound in a sample according to claim 1, wherein the selective ion permeable layer comprises Nafion™, polystyrene sulfonate, polyallylamine hydrochloride, or a mixture thereof.

13. A method for analyzing an ionic compound in a sample using the system of claim 1, the method comprising:
    injecting an ionic compound-containing sample(s) into a sample separation device of the system;
    folding the sample separation device(s) and inserting into a slot of the flexible holder, followed by applying a voltage to the folded sample separation device to conduct separation and concentration of the ionic compound-containing sample; and
    unfolding the folded sample separation device and recovering concentrated components from the ionic compound-containing sample for analysis.

14. The method according to claim 13, wherein the ionic compound-containing sample is injected in an amount of 0.01 ml to 2 ml.

* * * * *